(12) United States Patent
Abrol et al.

(10) Patent No.: US 7,342,894 B2
(45) Date of Patent: Mar. 11, 2008

(54) SYSTEM AND METHOD FOR TRANSPARENT MOBILE IP REGISTRATION WITHIN PPP NEGOTIATION

(75) Inventors: Nischal Abrol, San Diego, CA (US); Jeffrey Dyck, San Diego, CA (US); Marcello Lioy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1022 days.

(21) Appl. No.: 10/348,937

(22) Filed: Jan. 21, 2003

(65) Prior Publication Data

US 2003/0227937 A1  Dec. 11, 2003

Related U.S. Application Data

(60) Provisional application No. 60/370,029, filed on Apr. 3, 2002.

(51) Int. Cl.
H04L 12/28 (2006.01)

(52) U.S. Cl. .................. 370/254; 370/348
(58) Field of Classification Search ............. 370/441, 370/254, 255, 328, 329, 348
See application file for complete search history.

(56) References Cited

U.S. PATENT DOCUMENTS

| 5,708,655 | A * | 1/1998 | Toth et al. ............... 370/313 |
| 6,111,866 | A * | 8/2000 | Kweon et al. ............. 370/335 |
| 6,230,012 | B1 * | 5/2001 | Willkie et al. ........... 455/435.1 |
| 6,349,224 | B1 * | 2/2002 | Lim ........................ 455/466 |
| 6,483,822 | B1 * | 11/2002 | Lioy et al. ............... 370/329 |
| 2001/0016492 | A1 * | 8/2001 | Igarashi et al. ............. 455/433 |

(Continued)

FOREIGN PATENT DOCUMENTS

WO  0076173  12/2000

(Continued)

OTHER PUBLICATIONS

Malkin et al., "Dial-in Virtual Netowrks Using Layer 3 Tunneling", Local Computer Networks, IEEE 1997, pp. 555-561.*

(Continued)

*Primary Examiner*—Kwang Bin Yao
*Assistant Examiner*—Andrew Lai
(74) *Attorney, Agent, or Firm*—Howard Seo; Kam T. Tam; Tom Rouse

(57) ABSTRACT

A system and method for transparent Mobile IP registration within PPP negotiation uses a mobile telephone to relay messages between terminal equipment and a Foreign Agent (FA). An IPCP configuration request message by the terminal equipment requesting the assignment of an IP address is modified by the mobile telephone to delete the IP address request option. Other configuration options are forwarded unchanged by the mobile telephone to the peer/network. The peer/network responds with an acknowledgement of the requested configuration options and flow control between the terminal and the MT is asserted to permit Mobile IP registration. In the course of Mobile IP registration, and IP address is assigned to the mobile unit by the FA. Upon completion of the Mobile IP registration, flow control between the mobile telephone and the terminal is deasserted and the IP address assigned during Mobile IP registration is provided to the terminal equipment. In addition, the previously requested options may also be acknowledged.

31 Claims, 5 Drawing Sheets

U.S. PATENT DOCUMENTS

2002/0141369 A1* 10/2002 Perras ..................... 370/338
2002/0181498 A1* 12/2002 Hsu et al. .................. 370/466

FOREIGN PATENT DOCUMENTS

| WO | WO00761731 A1 * | 12/2000 |
| WO | 0141470 | 6/2001 |
| WO | 0152499 | 7/2001 |

OTHER PUBLICATIONS

Malkin, G. S., "Dial-in virtual private networks using layer 3 tunneling" Local Computer Networks, IEEE 1997, pp. 555-561.

* cited by examiner

SYSTEM AND METHOD FOR TRANSPARENT MOBILE IP REGISTRATION WITHIN PPP NEGOTIATION

RELATED APPLICATIONS

This application claims priority to pending Provisional application No. 60/370,029, filed on Apr. 3, 2002.

BACKGROUND

1. Technical Field

This invention generally relates to the field of wireless communications. More particularly, this invention relates to a system and method for efficient transparent Mobile Internet Protocol (MIP) registration within Point-to-Point (PPP) Protocol negotiation.

2. Description of Related Art

Recent advances in wireless communications and the rapid expansion of use of the Internet have greatly increased the demand for mobile computing. Code Division Multiple Access (CDMA) technology has played a critical role in meeting that demand.

CDMA is a digital radio-frequency (RF) technique defined in the Telecommunications Industry Association/ Electronics Industries Association Interim Standard-95, entitled "MOBILE STATION-BASE STATION COMPATIBILITY STANDARD FOR DUAL-MODE WIDEBAND SPREAD SPECTRUM CELLULAR SYSTEM," which was published in July 1993 and which is incorporated herein by reference.

CDMA communications devices assign a unique code to communications signals and spread those signals across a common spread-spectrum bandwidth. As long as the communications device has the correct code, it can successfully detect and select its signal from among other signals concurrently transmitted over the same bandwidth.

The increased reliability of mobile communications has led to a demand for remote wireless computing where a computing device, such as a laptop computer or palmtop computer, is remotely coupled to a computer network (e.g., the Internet) via the mobile telephone. Although IS-95 does not define the necessary protocol for such remote wireless computing, a number of standards do exist. The Internet Protocol (IP) standard has been incorporated into many wireless communication devices. The standard Request For Comment No. 791 (RFC 791) entitled INTERNET PROTOCOL DARPA INTERNET PROGRAM PROTOCOL SPECIFICATION, published in September 1981, is a network layer protocol that accommodates packetization of data for transmission. The addressing and routing information is included in packet headers. The headers contain addresses that identify the sending and receiving devices. These addresses are used by routers within the network to select a path to relay each packet to its ultimate destination at the intended destination address.

Another well-known protocol in wireless communications is the Point-to-Point Protocol (PPP), used to control wireless communications access to a computer network (e.g., the Internet). The PPP protocol is described in Request For Comment 1661 (RFC 1661), entitled THE POINT-TO-POINT PROTOCOL (PPP), published July 1994. The PPP protocol specifies standards for transporting data of point-to-point links including a technique for encapsulating multi-protocol data, a Link Control Protocol (LCP) to establish and configure a data link and Network Control Protocols (NCPs) to establish and configure network-layer protocols.

Another standard, designated IETF RFC 2002. entitled IP MOBILITY SUPPORT FOR IPv4 (a/k/a Mobile IP) provides communications standards for Mobile IP, but does not address wireless aspects of mobile computing.

With the adoption of third generation (3G) standards for CDMA communication, telecommunication standards have been introduced for wireless network communication. Telecommunication Standard IS-835, entitled CDMA 2000 WIRELESS NETWORK STANDARD, published in June 2000, and telecommunication standard IS-835A, published in May 2001 mandate a certain communication protocol for use with 3G CDMA devices.

FIG. 1 is a functional block diagram illustrating a wireless computer network connection. In FIG. 1 a terminal equipment (TE) 10 may be a laptop, palmtop, or other conventional computing device. The TE 10 is coupled to a wireless communication device, such as a mobile telephone (MT) 12. The TE 10 communicates with the MT 12 via a connection designated by standards as an $R_m$ interface. The $R_m$ interface may be implemented by a variety of known technologies. For example, the $R_m$ interface could be implemented via conventional RS-232, RS-422, IEEE 4888, IEEE 1394, Bluetooth Technology, or the like. These conventional interface technologies are well known in the art and need not be described herein. The present invention is not limited by the specific form of the $R_m$ interface.

The TE 10 and MT 12 may conveniently be collectively characterized as a mobile station (MS) 14, as indicated by the dashed lines in FIG. 1. The MT 12 includes a transmitter 16 and receiver 18 that operate in a known fashion to permit voice or data communications with a remote location.

The wireless communication system of FIG. 1 also includes a base station transceiver system (BTS) 20, which may also comprise a mobile switching center (MSC). The BTS 20 communicates with the MS 14 via a wireless interface, designated by standards as a $U_m$ interface. Operational details of the $U_m$ interface are known to those of ordinary skill in the art and need not be described in greater detail herein. The BTS 20 is coupled to a computer network 22 via an interface, designated by standards as an L interface. Operational details of the L interface is also designated by industry standards and need not be described in greater detail herein.

To establish a communication link between the TE 10 and the network 22, communication data packets are exchanged via the $R_m$ and $U_m$ interfaces and a PPP session must be established. The various protocols and standards described above provide a framework for implementing a wireless computer network connection. The actual implementation of hardware and software within that framework is left to the discretion of the designer. While the various standards described above provide for such Mobile IP registration, the overlapping standards often result in inefficiencies in the registration process. Therefore, it can be appreciated that there is a significant need for an optimized registration process for mobile computing applications. The present invention provides this, and other advantages, as will be apparent from the following detailed description and accompanying figures.

SUMMARY

In an exemplary embodiment, the present invention is a method for wireless network registration of a computing device coupled to a wireless communication device and comprises initiating a point-to-point protocol (PPP) negotiation between the computing device and a computer network. Messages are relayed from the computing device to the computer network to initiate the PPP negotiation between the computing device and the computer network. While the PPP negotiation is occurring, the method further comprises receiving a configuration request message from the computing device, the configuration request message comprising a request for an assignment of a network address for the computing device. The configuration request message is altered to delete the address assignment request and the altered configuration request message is transmitted to the computer network. A configuration acknowledgement is transmitted from the computer network in response to the altered configuration request message. The method further comprises performing a Mobile IP computer network registration prior to completion of the PPP negotiation, the Mobile IP registration including the assignment of a computer network address from the computer network. The PPP negotiation is completed using the assigned network address as the network address for the computing device.

In one embodiment, the configuration request message is an Internet Protocol Control Protocol (IPCP) message sent by the computing device. The configuration request message may also contain other configuration options and the method further comprises relaying the altered configuration request message with the other configuration options.

In one embodiment, the configuration acknowledgement message is received and temporarily stored by the wireless communication device. The wireless communication device subsequently generates a configuration acknowledgement message for the computing device wherein data from the stored configuration is included in the configuration acknowledgement message.

The method may further comprise suspending the PPP negotiation during the Mobile IP computer network registration. The suspension of the PPP negotiation may comprise asserting flow control to block communication between the computing device and the wireless communication device during the Mobile IP computer network registration. In this embodiment, the method further comprises deasserting flow control to permit communication between the computing device and the wireless communication device upon completion of the Mobile IP computer network registration.

DETAILED DESCRIPTION OF THE EMBODIMENTS

The present invention is directed to techniques for Mobile IP registration. As discussed above with respect to FIG. 1, the goal is to register mobile terminal equipment (e.g., the TE 10) with a computer network (e.g., the network 22), such as the Internet. In particular, the present invention is directed to an efficient method for transparent Mobile IP registration that occurs within the PPP negotiation.

Figure 1:
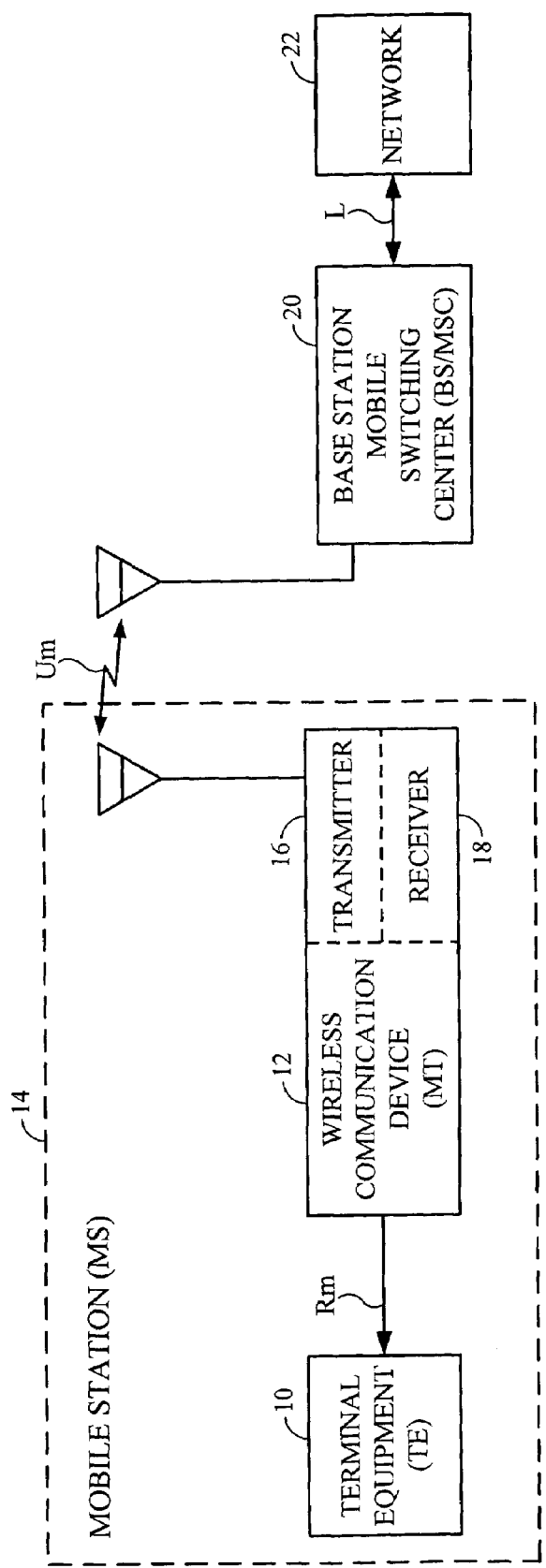
FIG. 1 is a functional block diagram of wireless link of a computing device with a computer network.

As noted above, a number of different standards exist to govern wireless IP communication. These standards may be implemented in a number of different ways to provide some flexibility to the designer. FIG. 1 illustrates the simplified general wireless network that supports the communication process. The communication process between the TE 10 and the network 22 is illustrated at an IP communication layer in the functional block diagram of FIG. 2. As previously discussed, the TE 10 communicates with the MT 12 via the $R_m$ interface. In turn, the MT 12 communication with a Foreign Agent (FA) 26 via the $U_m$/A interface. The "A interface" illustrated in FIG. 2 refers collectively to the A8, A9, A10, and A11 interfaces that comprise the BS/MSC to PDSN connection in an IS-835 network, as specified in TIA/EIA-2001-A entitled "INTEROPERABILITY SPECIFICATIONS (IOS) FOR CDMA 2000 ACCESS NETWORK INTERFACES," which was published in August 2001 and which is incorporated herein by reference. Note that the term "A interface" is not standardized. Other interfaces (i.e., A1-A11) are defined in IS-835, but are directed to interfaces involving the BS/MSC and are extraneous to an understanding of present system. Those skilled in the art will recognize that the A interface refers to one or more interfaces defined in IS-835. In accordance with some communication standards the MT 12 may communicate with a peer, such as the packet data switching node (PDSN) described in IS-835, which is, in an exemplary embodiment, associated with the FA 26.

Figure 2:
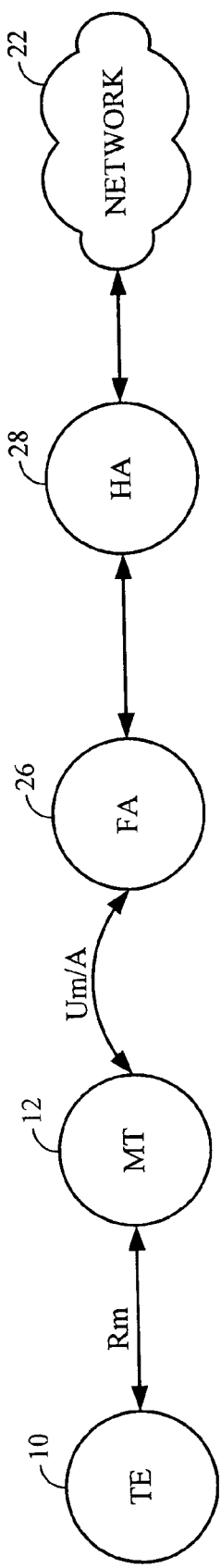
FIG. 2 illustrates a logical connection between a computing device and a Mobile IP network using a wireless system similar to that of FIG. 1.

It should be noted that the BTS 20 is not illustrated in FIG. 2 since it essentially functions as a transparent relay mechanism at the network level. The BTS 20 plays no role in communication at the IP layer level. The FA 26 serves as a roaming connection point between the TE 10 and the network 22. If the MT 12 performs a handoff (i.e., switches to a different BTS), the FA 26 may also change. Thus, as the MT 12 moves, it corresponds with the local FA 26.

The FA 26 communicates with a Home Agent (HA) 28. The FA 26 and HA 28 are both processes specified for Mobile IP communication. The HA 28 acts as a broker of data in a communication link between the FA 26 and the network 22. The HA 28 is a fixed point and has the specified IP address used by the network 22. Even as the MT 12 is handed off to a different BTS, the HA 28 remains fixed throughout the IP session between the TE 10 and the network 22.

Figure 3:
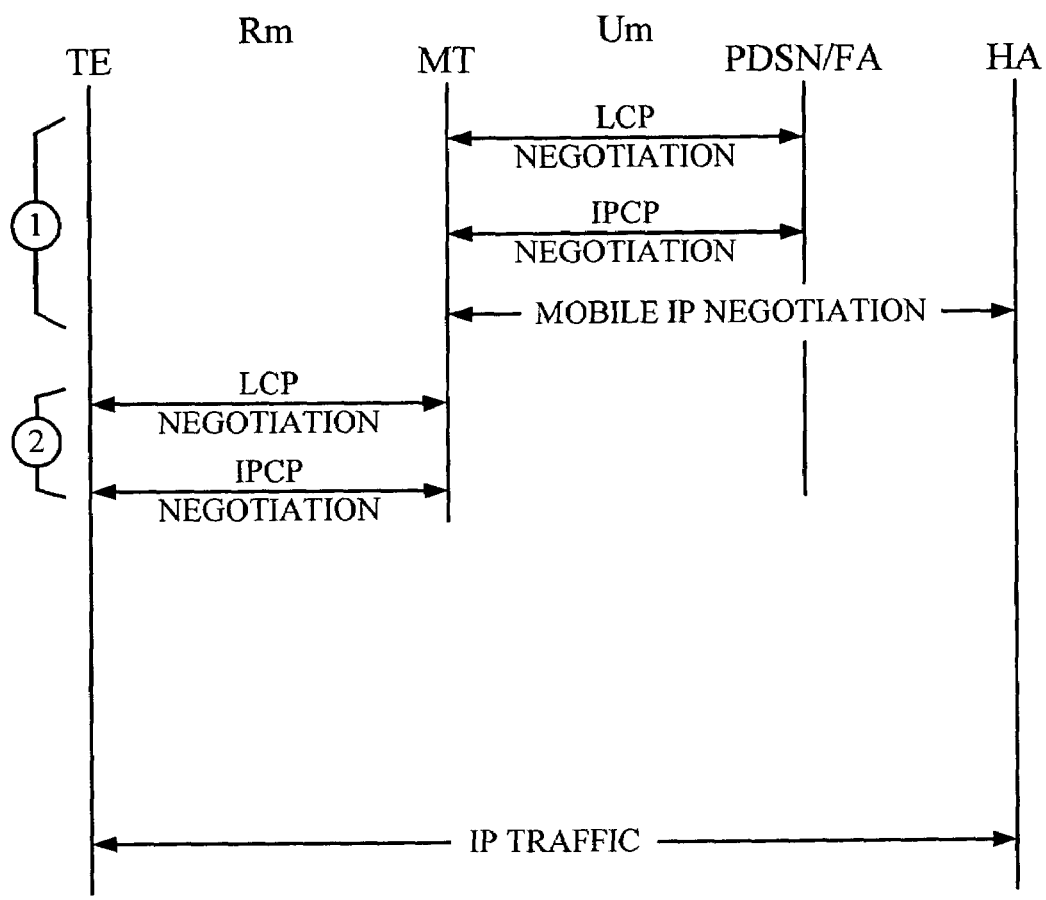
FIG. 3 illustrates the processing steps in negotiating a wireless communication link using the system of FIG. 2.

The system illustrated in FIG. 2 illustrates the entities involved in Mobile IP registration. FIG. 3 illustrates the flow of messages back and forth between the various components of the system. The terminal equipment (e.g., the TE 10 of FIG. 1) is indicated at the left of FIG. 3 while the network (e.g., the network 22 of FIG. 1) is indicated at the right of FIG. 3. Intermediate the terminal equipment and the network is the mobile telephone (e.g., the MT 12 of FIG. 1), indicated by the designation MT. Also illustrated in FIG. 3 is the FA (e.g., the FA 26 of FIG. 2) and the HA (e.g., the HA 28 of FIG. 2). Those skilled in the art will recognize that communications flow between the MT 12 and the network 22 via the BTS (e.g., the BTS 20 of FIG. 1). However, some portion of the process illustrated in FIG. 3 is described at the network layer and not the physical link layer. Thus, for the sake of convenience, FIG. 3 illustrates communications between the MT 12 and the FA 26 over the $U_m$ interface.

In FIG. 3, the process indicated by reference numeral 1 is the Mobile IP registration process that occurs between the MT 12 and the FA 26. This process includes Link Control Protocol (LCP) negotiation and Internet Protocol Control Protocol (IPCP) negotiation. Those skilled in the art will appreciate that a number of messages may flow back and forth between the MT 12 and the FA 26 for both the LCP negotiation and the IPCP negotiation. Messages are transmitted from the MT 12 using the transmitter within the wireless communication device while the receiver within the wireless communication device receives negotiation messages. For the sake of clarity, only selected messages that are closely related to Mobile IP registration are illustrated in FIG. 3. During this process, a PPP session, designated as session A, is established on the $U_m$ interface. The MT 12 performs a Mobile IP registration on the $U_m$ interface and is assigned an IP address.

In a subsequent process, indicated by reference numeral 2 in FIG. 3, registration of the terminal equipment (e.g., the TE 10 of FIG. 1) occurs in communications with the MT (e.g., the MT 12 of FIG. 1). During this process, a second PPP session, designated as session B, occurs on the $R_m$ interface. Those skilled in the art will recognize that a number of messages are transmitted back and forth between the TE 10 and the MT 12 for both the LCP negotiation and the IPCP negotiation during the session B. For the sake of brevity, those individual messages are not illustrated in FIG. 3.

The MT 12 furnishes the TE 10 with the previously assigned IP address. The protocol options between session A and session B may not be identical. The subsequent Mobile IP negotiations are transparent to session B. Subsequent IP traffic occurs between the TE 10 and the network 22 via the MT 12 and the BTS 20 as indicated at the bottom of FIG. 3. The process illustrated in FIG. 3 conforms to the multiple communication standards and will ultimately result in the proper IP address assignment. However, the process of FIG. 3 requires multiple sessions.

Figure 4:
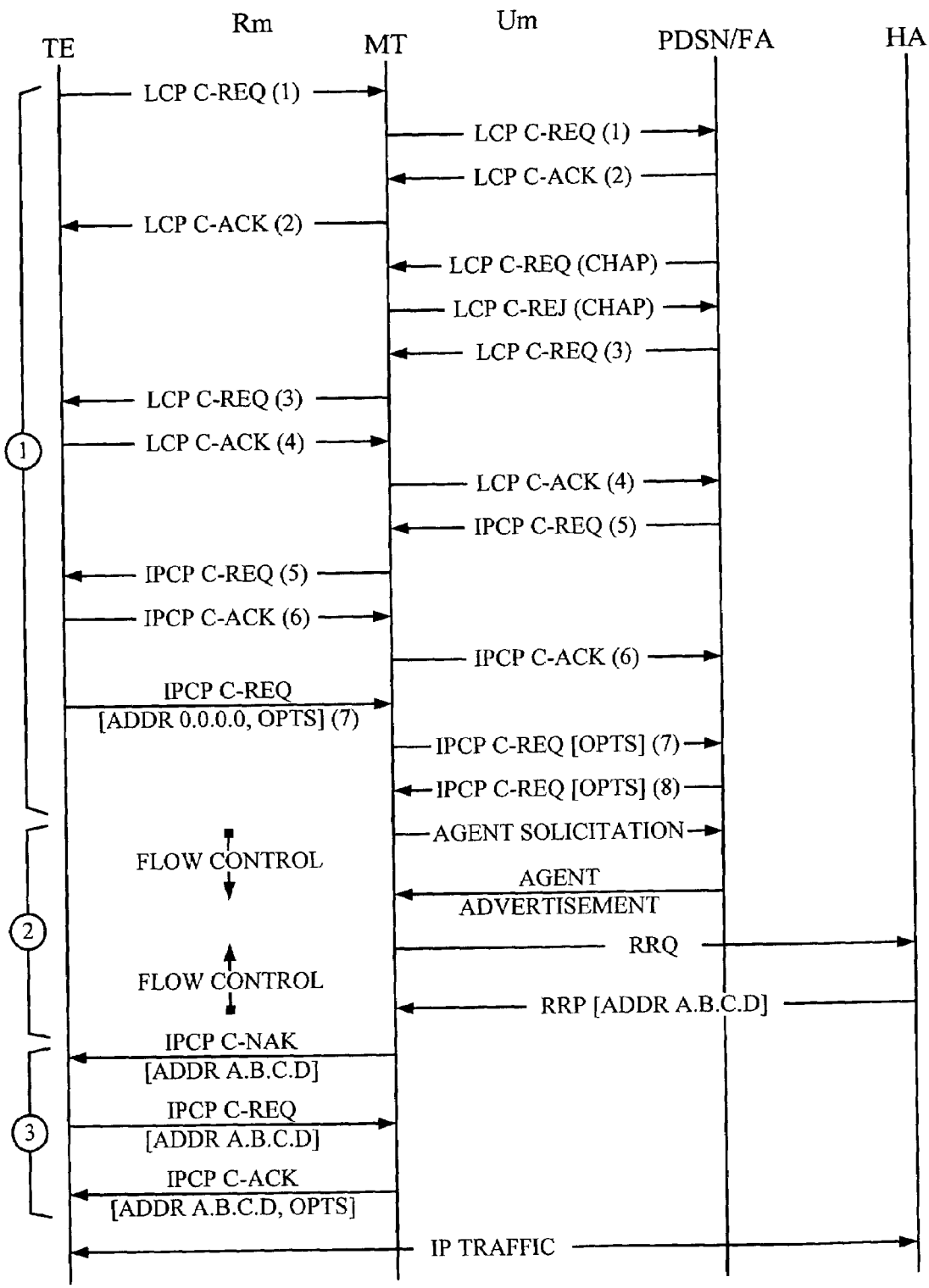
FIG. 4 is an optimized registration process.

A more optimal solution is presented in FIG. 4. The process illustrated in FIG. 4 includes both LCP negotiations and IPCP negotiations. The messages flow from the TE (e.g., the TE 10 of FIG. 1) at the left of FIG. 1 to the MT (e.g., the MT 12 of FIG. 1) via the $R_m$ interface. Messages are sent by the MT 12 to the FA (e.g., the FA 26 of FIG. 2) by use of the mobile transmitter 16 (see FIG. 1). Messages destined for the MT 12 from the FA are received by the mobile receiver 18. This wireless air link is referred to as the $U_m$ interface.

In the process illustrated in FIG. 4, the IP registration process is initiated by the TE 10 by sending an LCP configuration request (LCP C-Req) message to the MT 12. Alternatively, the process may be initiated by a C-Req from the MT 12 to the TE 10. The LCP C-Req message is indicated by the message reference numeral (1) between the TE and the MT in FIG. 4. The reference numerals associated with various messages illustrated in FIG. 4 are intended to generally indicate the sequential nature of the messages and do not refer to specific message types. That is, the standards specify an LCP C Req message, but do not specify an LCP C-Req (1) message. The reference numerals are added in FIG. 4 to provide greater understanding of the sequential nature of the messages and, as will be described below, the relationship of messages transferred between the TE 10 and the MT 12 and between the MT and the FA 26. The MT 12 relays the LCP C-Req (1) message to the FA 26 via the $U_m$ interface. Most of the messages transmitted on the $U_m$ interface are not modified in any manner by the MT 12. That is, the MT 12 receives the LCP C-Req (1) message from the TE 10 and simply passes it along, unaltered, to the FA 26. One exception is message (7), which is modified by a communication processor within the MT 12 in the manner described in greater detail below.

The FA 26 responds to the configuration request message with an LCP configuration acknowledge message (LCP C-Ack (2)) to the MT 12 on the $U_m$ interface. The MT 12 relays the LCP C-Ack (2) message to the TE 10 on the $R_m$ interface without any alterations.

In accordance with IS-835, the FA 26 will send an LCP configuration request to the MT 12, including a Challenge Handshake Authentication Protocol (CHAP) (LCP C-Req (CHAP)) option. Although the CHAP option is specified in the LCP C-Req, Mobile IP communication under IS-835 must not use CHAP. Thus, if the FA 26 sends the LCP C-Req (CHAP) message, the MT 12 will respond with an LCP C-Rej (CHAP) message to the BTS 20 to reject the CHAP configuration protocol. It should be understood that not all standards preclude CHAP authentication and, thus, the configuration request for CHAP and the configuration rejection of CHAP are not necessary for all implementations of the present invention. As previously discussed, IS-835 defines the PDSN as the entity which, in the present invention, is the peer device in which the PPP session is terminated.

As part of the LCP negotiation, the FA 26 transmits an LCP configuration request message, indicated in FIG. 4 as LCP C-Req (3), to the MT 12 over the $U_m$ interface. The MT 12 relays the LCP C-Req (3) message to the TE 10 over the $R_m$ interface without any alterations. The TE 10 responds with an acknowledgment message (LCP C-Ack (4)) over the $R_m$ interface to the MT 12. The MT 12 relays LCP C-Ack (4) message to the FA 26 over the $U_m$ interface without any alterations. The process of LCP negotiation and the data contained within the messages described above is known in the art and need not be described in greater detail herein.

Following completion of the LCP negotiation, the FA 26 initiates the IPCP negotiation by transmitting an IPCP configuration request (IPCP C-Req (5)) message to the MT 12 over the $U_m$ interface. The MT 12 relays the IPCP C-Req (5) message unaltered to the TE 10 over the $R_m$ interface without any alterations. The TE 10 responds to the configuration request message with a configuration acknowledgement (IPCP C-Ack (6)) message transmitted to the MT 12 over the $R_m$ interface. The MT 12 relays the IPCP C-Ack (6) message to the FA 26 over the $U_m$ interface.

The TE 10 subsequently generates a configuration request (IPCP C-Req [addr 0.0.0.0, Opts] (7)) message to the MT 12. The configuration request in message (7) includes a request for the assignment of a dynamic address. The IPCP C-Req [addr 0.0.0.0, Opts] (7) message specifies an address of 0.0.0.0, which is interpreted as a request for the dynamic assignment of a IP address. In addition, the IPCP C-Req [addr 0.0.0.0, Opts] (7) message may include other optional configuration requests, indicated generically as Opts in FIG. 4.

To avoid the additional PPP negotiations required to reassign an IP address, the communication processor in the MT 12 processes the IPCP C-Req [addr 0.0.0.0, Opts] (7) message to delete the assignment of a dynamic address. The communication processor, which may be implemented as a set of computer instructions by the MT 12, strips out this portion of the message and relays the configuration request message only for the requested options, but not requesting the dynamic assignment of a IP address. In response to the IPCP C-Req [Opts] (7) message, the FA 26 transmits an acknowledgement message (IPCP C-Ack [Opts] (8)) to the MT 12 over the $U_m$ interface. This message acknowledges the requested options which were requested by the TE 10 in configuration request message (7). Those skilled in the art will appreciate that other intermediate negotiations may occur. However, for the sake of brevity, the simplest case is described herein. Any additional intermediate negotiations are well known and need not be described in greater detail herein. Because no address is yet available to accompany these options, the MT 12 does not immediately relay the acknowledgement message to the TE 10, but retains the information within a storage location in the MT 12.

This temporarily ends the PPP negotiation between the TE 10 and the network 22. The PPP negotiation will be completed following the Mobile IP negotiation, which is indicated by the reference numeral 2 at the left of FIG. 4. Within the Mobile IP negotiation, there are a number of known processes, such as agent solicitation and agent advertisement that occur between the MT 12 and the FA 26 over the $U_m$ interface. These processes are known in the art and need not be described in greater detail herein.

A drawback of certain operating systems is that the PPP negotiation will fail if it is not completed within a relatively short time-out period specified by the operating system. There are known techniques for avoiding PPP time outs during the Mobile IP negotiation.

The technique used to avoid a time-out error in the TE 10 is illustrated generically in FIG. 4 as flow control. Flow control is asserted at the time the MT 12 begins the Mobile IP negotiation and is deasserted when the Mobile IP negotiation is complete.

For example, some hardware implementations of the $R_m$ interface provide control lines that are intended to control data flow. For example, an RS-232 interface includes a Clear To Send (CTS) control line to indicate that a device is ready to receive data. Deasserting the CTS control line indicates that the device is not ready to receive data. Although the CTS control line is generally intended to control data flow, it can be used to avoid time outs since the operating system in the TE 10 will behave as if it is simply waiting for the MT 12 to assert the CTS control line and indicate its willingness to accept more data. This is a simple hardware solution to the potential time-out problem.

Other hardware implementations of the $R_m$ interface do not have such hardware control lines. Rather, data flow is controlled via messages exchanged between the TE 10 and the MT 12 over the $R_m$ interface. However, there are techniques to control data flow and avoid time-out errors in such control implementations. One such technique is described in an application entitled METHOD OF AVOIDING PPP TIME-OUTS DURING IPCP NEGOTIATIONS, which is assigned to the assignee of the present invention and published as PCT Publication WO 01/52499 on Jul. 19, 2001, and incorporated herein by reference in its entirety. In that document, the time out is avoided by having the MT 12 propose an arbitrary IP address to the TE 10 via an IPCP C-Nak message. In response, the TE 10 transmits a configuration request to the MT 12 requesting the arbitrarily assigned IP address. Until the MT 12 is assigned an IP address by the peer/network 22, the MT 12 will reject the configuration request using an IPCP C-Nak message proposing an arbitrary IP address.

This process repeats until the IP address is furnished by the peer/network 22. The time-out errors are avoided because the TE 10 is actively communicating with the MT 12. Thus, solicitation and agent advertisement processes between the MT 12 and the BTS 20 on the $U_m$ interface can occur without encountering a time-out error within the TE 10.

As part of the Mobile IP registration, the MT 12 transmits a registration request (RRQ) message to the network 22. The network 22 responds with a registration reply (RRP) message which includes the assignment of an IP address, designated in FIG. 4 as "addr a.b.c.d" in a message transmitted to the MT 12 over the $U_m$ interface.

At this point in time, the Mobile IP registration has been completed and a IP address (addr a.b.c.d.) has been assigned by the network 22. The flow control of communications between the TE 10 and the MT 12 is now deasserted and the PPP negotiation is completed in a set of steps indicated generally by the reference numeral 3 at the left of FIG. 4. A Not-Acknowledged (IPCP C-Nak [addr a.b.c.d]) message is generated by the MT 12 and transmitted to the TE 10 over the $R_m$ interface. Although this is a Not-Acknowledged message, it does provide the assigned IP address to the TE 10.

In response to the IPCP C-Nak [addr a.b.c.d] message, the TE 10 generates a configuration request (IPCP C-Req [addr a.b.c.d]) message transmitted to the MT 12 over the $R_m$ interface. The MT 12 responds to the IPCP C-Req [addr a.b.c.d.] message with an acknowledgement (IPCP C-Ack [addr a.b.c.d, Opts]) message to acknowledge the assignment of IP address addr a.b.c.d and the acknowledgment of the previously requested options. As previously discussed, the options were requested by the TE 10 in the IPCP C-Req [addr 0.0.0.0, Opts] (7) message (with the address assignment request being deleted by the MT 12) and acknowledged by the FA 26 in the IPCP C Ack [Opts] (8) message which was received and stored by the MT 12 during the earlier portion of the PPP negotiations. Thus, the system has successfully negotiated a Mobile IP registration within the PPP negotiation, thus avoiding the necessity of multiple sessions and the re-assignment and re-request for a new IP address. Subsequent communications occur between the TE 10 and the network 22 via the established communication links.

Figure 5:
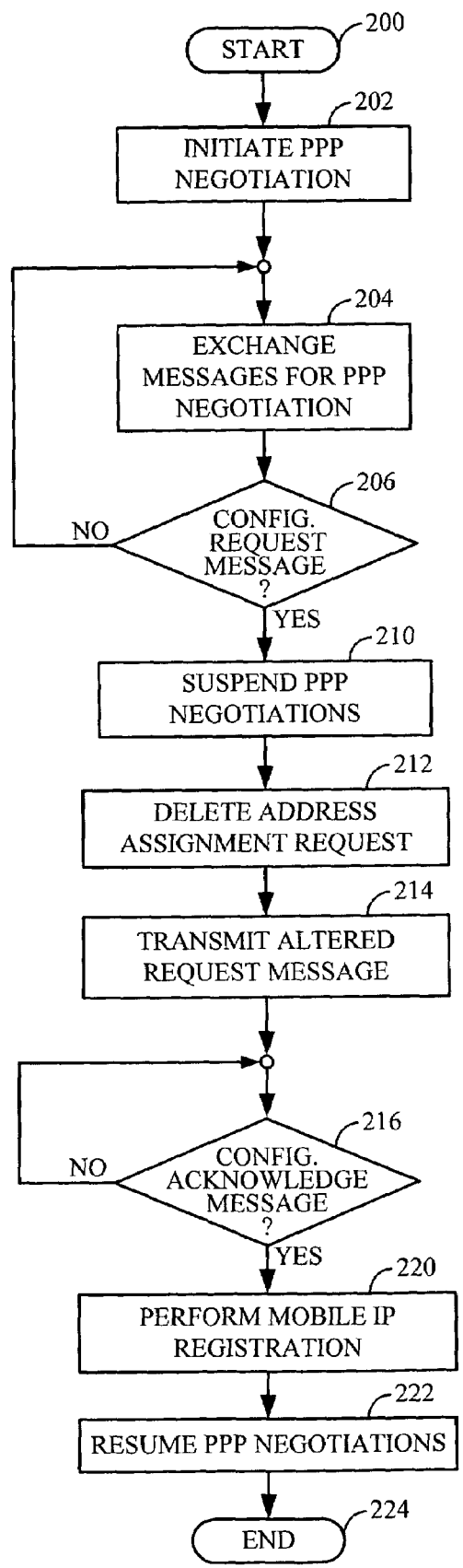
FIG. 5 is a flowchart illustrating the operation of one embodiment of the present invention.

FIG. 5 is a flowchart illustrating the operation of an exemplary embodiment. At a start 200, the MS 14 is under power and the user has elected to establish a wireless link. In step 202, the MS 14 initiates the PPP negotiation. In step 204, the MS 14 exchanges messages with the FA 26 (see FIG. 2) as part of the PPP negotiation. Example messages are illustrated in FIG. 4. However, as discussed above, the messages of FIG. 4 are illustrative of an example negotiation process and are not intended to provide an exhaustive description of the known PPP negotiation process.

In decision 206, the MT 12 awaits a configuration request message from the TE 10 (see FIG. 1). If the configuration request message is not received, the result of decision 206 is NO and the process returns to 204 where the PPP negotiations continue. If the configuration request message is received, the result of decision 206 is YES. In that event, the MT 12 temporarily suspends the PPP negotiations in step 210. As discussed above, there are a number of flow control techniques that may be used to suspend the PPP negotiations without terminating them.

In step 212, the MT 12 alters the configuration request message to delete the address assignment request portion of that message. In step 214, the MT 12 transmits the altered configuration request message to the FA 26 (see FIG. 2). In decision 216, the MT 12 awaits a configuration acknowledge message from the FA 26. If the configuration acknowledge message is not received, the result of decision 216 is NO. In that event, the process returns to decision 216 to await the receipt of the configuration acknowledge message.

When the configuration acknowledge message is received, the result of decision 216 is YES. In that event, the MS 14 (see FIG. 1) performs a mobile IP registration in step 220. Upon completion of the mobile IP registration process in step 220, the MS 14 resumes the previously suspended PPP negotiations in step 222. The process ends at 224 with the mobile IP registration having occurred within the PPP negotiation. As discussed above, this process avoids the necessity of multiple PPP negotiations.

The process of transparent Mobile IP registration with the PPP negotiation has been described with respect to certain industry standards. However, those skilled in the art will recognize that the principles of the present invention may be applied in Mobile IP registration in accordance with other standards. Thus, the present invention is not to be limited except by the appended claims.

What is claimed is:

1. A method for wireless network registration of a computing device coupled to a wireless communication device, comprising:
    initiating a point-to-point protocol (PPP) negotiation between the computing device and a computer network;
    transferring messages received from the computing device to the computer network to initiate the PPP negotiation between the computing device and the computer network;
    while the PPP negotiation is occurring, receiving a configuration request message from the computing device, the configuration request message comprising a request for an assignment of a network address for the computing device;
    altering the configuration request message to delete the address assignment request;
    transmitting the altered configuration request message to the computer network for network-layer protocol configuration between the computing device and the computer network;
    receiving a configuration acknowledgement transmitted from the computer network in response to the altered configuration request message;
    performing a Mobile IP registration prior to completion of the PPP negotiation, the Mobile IP registration furnishing the assignment of a network address from the computer network; and
    completing the PPP negotiation using the assigned network address as the network address for the computing device.

2. The method of claim 1 wherein the configuration request message is an internet protocol control protocol (IPCP) message sent by the computing device.

3. The method of claim 1 wherein the configuration request message contains other configuration options, the method further comprising relaying the altered configuration message with the other configuration options.

4. The method of claim 3 wherein the configuration acknowledgement is received and temporarily stored by the wireless communication device.

5. The method of claim 4, further comprising the wireless communication device generating a configuration acknowledgement message for the computing device wherein data from the stored configuration is included in the configuration acknowledgement message.

6. The method of claim 1 wherein the PPP negotiation comprises a CHAP configuration request transmitted by a PDSN to the wireless communication device, the method further comprising generating a configuration reject message to reject the CHAP configuration request.

7. The method of claim 1 wherein the network address is assigned in response to a registration request from the wireless communication device for the Mobile IP registration.

8. The method of claim 1, further comprising suspending the PPP negotiation during the Mobile IP registration.

9. The method of claim 8, further comprising asserting flow control to block communication between the computing device and the wireless communication device during the Mobile IP registration.

10. The method of claim 9, further comprising deasserting flow control to permit communication between the computing device and the wireless communication device upon completion of the Mobile IP registration.

11. The method of claim 8, further comprising controlling communication between the computing device and the wireless communication device during the Mobile IP registration to avoid time out errors within the computing device.

12. The method of claim 11 wherein controlling communication between the computing device and the wireless communication device comprises transmitting a configuration request message from the computing device to the wireless communication device and, in response to the configuration request message, transmitting a configuration not acknowledged message from the wireless communication device to the computing device.

13. The method of claim 12 wherein the configuration request message comprises an arbitrary computer network address and the configuration not acknowledged message comprises a rejection of the arbitrary computer network address.

14. A system for wireless network registration of a computing device coupled to a wireless communication device, the system comprising:
    a transmitter associated with the wireless communication device to transmit messages received from the computing device to a computer network to initiate a point-to-point protocol (PPP) negotiation between the computing device and the computer network;
    a communications processor to process a configuration request message from the computing device while the PPP negotiation is occurring, the configuration request message comprising a request for an assignment of a network address for the computing device, wherein the communication processor alters the configuration request message to delete the address assignment request and the transmitter transmits the altered configuration request message to the computer network for network-layer protocol configuration between the computing device and the computer network; and
    a receiver associated with the wireless communication device to receive a configuration acknowledgement message transmitted from the computer network in response to the altered configuration request message wherein the communication processor performs a Mobile IP registration prior to completion of the PPP negotiation, the Mobile IP registration including the assignment of a network address from the computer network, and wherein the communication processor completes the PPP negotiation using the assigned network address as the network address for the computing device.

15. The system of claim 14, further comprising a computer interface wherein the configuration request message is an internet protocol control protocol (IPCP) message sent by the computing device and received by the computer interface.

16. The system of claim 14 wherein the configuration request message contains additional configuration options, the communication processor relaying the altered configuration message with the additional configuration options.

17. The system of claim 14, further comprising
a storage location wherein the configuration acknowledgement message is received and data relating thereto temporarily stored in the storage location.

18. The system of claim 17 wherein the communication processor generates a configuration acknowledgement message for the computing device wherein data from the stored configuration is included in the configuration acknowledgement message.

19. The system of claim 14 wherein the receiver receives the network address assigned in response to a registration request from the wireless communication device.

20. The system of claim 14, further comprising
a computer interface controller to assert flow control to block communication between the computing device and the wireless communication device during the Mobile IP registration.

21. The system of claim 20 wherein the computer interface controller deasserts flow control to permit communication between the computing device and the wireless communication device upon completion of the Mobile IP registration.

22. The system of claim 14, further comprising
a computer interface controller to control communication between the computing device and the wireless communication device, the computer interface controller asserting a flow control signal during the Mobile IP registration to avoid time out errors within the computing device.

23. An apparatus for wireless network registration of a computing device coupled to a wireless communication device, the apparatus comprising:
transmitter means associated with the wireless communication device for transmitting messages received from the computing device to a computer network to initiate a point-to-point protocol (PPP) negotiation between the computing device and the computer network;
communication processor means for:
relaying messages received from the computing device to the computer network to initiate the PPP negotiation between the computing device and the computer network;
receiving a configuration request message from the computing device while the PPP negotiation is occurring, the configuration request message comprising a request for an assignment of a network address for the computing device; and
altering the configuration request message to delete the address assignment request, wherein the transmitter means transmits the altered configuration request message to the computer network for network-layer protocol configuration between the computing device and the computer network; and
receiver means associated with the wireless communication device for receiving a configuration acknowledgement message transmitted from the computer network in response to the altered configuration request message, wherein the communication processor performs a Mobile IP registration prior to completion of the PPP negotiation, the Mobile IP registration including the assignment of a network address from the computer network, and wherein the communication processor means completes the PPP negotiation using the assigned network address as the network address for the computing device.

24. The apparatus of claim 23 wherein the configuration request message is an internet protocol control protocol (IPCP) message sent by the computing device.

25. The apparatus of claim 23 wherein the configuration request message contains other configuration options, the communication processor means further comprising means for relaying the altered configuration message with the other configuration options.

26. The apparatus of claim 23, further comprising
storage means for receiving and temporarily storing the configuration acknowledgement.

27. The apparatus of claim 26 wherein the communication processor means comprises means for generating a configuration acknowledgement message for the computing device wherein data from the stored configuration is included in the configuration acknowledgement message.

28. The apparatus of claim 23, further comprising
means for suspending the PPP negotiation during the Mobile IP registration.

29. The apparatus of claim 28 wherein the means for suspending the PPP negotiation operates by asserting flow control to block communication between the computing device and the wireless communication device during the Mobile IP registration.

30. The apparatus of claim 29, further comprising
means for deasserting flow control to permit communication between the computing device and the wireless communication device upon completion of the Mobile IP registration.

31. The apparatus of claim 23, further comprising
means for controlling communication between the computing device and the wireless communication device during the Mobile IP registration to avoid time out errors within the computing device.

* * * * *